US012766544B2

(12) United States Patent
Kurz

(10) Patent No.: US 12,766,544 B2
(45) Date of Patent: Oct. 20, 2026

(54) COATING DEVICE AND METHOD FOR SUPPLYING A LACQUER AND A SOLVENT TO A LACQUER MIXTURE

(71) Applicant: Carl Zeiss Vision International GmbH, Aalen (DE)

(72) Inventor: Norbert Kurz, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/666,767

(22) Filed: May 16, 2024

(65) Prior Publication Data

US 2024/0299973 A1 Sep. 12, 2024

Related U.S. Application Data

(63) Continuation of application No. PCT/EP2022/084815, filed on Dec. 7, 2022.

(30) Foreign Application Priority Data

Dec. 8, 2021 (EP) .................................... 21213095

(51) Int. Cl.

*B05C 11/10* (2006.01)
*B05C 3/09* (2006.01)
*G02B 1/14* (2015.01)

(52) U.S. Cl.

CPC ............ *B05C 11/1039* (2013.01); *B05C 3/09* (2013.01); *B05C 11/1005* (2013.01); (Continued)

(58) Field of Classification Search

CPC ........................................................ B05B 5/16
See application file for complete search history.

(56) References Cited

U.S. PATENT DOCUMENTS

| | | | | |
|---|---|---|---|---|
| 3,880,228 | A * | 4/1975 | Houk | B05B 5/16 165/104.31 |
| 5,014,737 | A | 5/1991 | Berman | |
| 2007/0240643 | A1 | 10/2007 | Yoshioka et al. | |

FOREIGN PATENT DOCUMENTS

| | | | |
|---|---|---|---|
| EP | 3 089 826 B1 | | 2/2021 |
| JP | 07209884 A | * | 8/1995 |

(Continued)

OTHER PUBLICATIONS

Office Action by the Euopean Patent Office (EPO) issued in EP 22 830 854.0, to which this application claims priority, mailed on Sep. 27, 2024.

(Continued)

*Primary Examiner* — Dah-Wei D. Yuan
*Assistant Examiner* — Andrew J Bowman
(74) *Attorney, Agent, or Firm* — Qubit IP, PLLC

(57) ABSTRACT

A coating device for dip coating an ophthalmic lens is provided. The coating device includes a lacquer basin for receiving a lacquer mixture, which contains a lacquer and a solvent. The coating device has an overflow channel arranged at the lacquer basin for collecting the lacquer mixture overflowing from the lacquer basin, and a tubing system for providing an influx of the lacquer mixture to the lacquer basin, which is connected to the overflow channel for collecting a return flux of the lacquer mixture from the overflow channel to enable circulation of the lacquer mixture through the lacquer basin, the overflow channel, and the tubing system. The coating device includes a supply unit for dosing the lacquer and the solvent for the lacquer mixture, which is connected to the tubing system and configured to feed at least one of the lacquer and the solvent directly into the tubing system.

30 Claims, 3 Drawing Sheets

(52) U.S. Cl.
CPC ...... *B05C 11/1026* (2013.01); *B05C 11/1042* (2013.01); *G02B 1/14* (2015.01)

(56) References Cited

FOREIGN PATENT DOCUMENTS

| | | |
|---|---|---|
| JP | H07 209884 A | 8/1995 |
| JP | H11 76893 A | 3/1999 |

OTHER PUBLICATIONS

Industrial Norm "Ophthalmic optics—Spectacle lenses—Vocabulary (ISO 13666:2019)," English version EN ISO 13666:2019, Dec. 2019.
European Search Report issued in EP 21 213 095.9, to which this application claims priority, mailed Jun. 2, 2022.
International Search Report and Written Opinion issued in PCT/EP2022/084815, to which this application claims priority, mailed Feb. 8, 2023.
Written opinion issued in PCT/EP2022/084815, to which this application claims priority, mailed Nov. 7, 2023.
International Preliminary Report on Patentability issued in PCT/EP2022/084815, to which this application claims priority, mailed Mar. 20, 2024.
Intention to grant European patent application EP 22 830 854.0, which is a counterpart hereof, mailed Apr. 2, 2025.
European Search Report issued in EP 24 178 326.5, which is a counterpart hereof, mailed Sep. 16, 2024.
European Search Report issued in EP 24 178 325.7 , which is a counterpart hereof, mailed Sep. 17, 2024.
Office action by the European Patent Office issued in EP 24 178 326.5, which is a counterpart hereof, mailed Apr. 9, 2026.

* cited by examiner

COATING DEVICE AND METHOD FOR SUPPLYING A LACQUER AND A SOLVENT TO A LACQUER MIXTURE

CROSS REFERENCE TO RELATED APPLICATIONS

This application is a continuation application of international patent application PCT/EP2022/084815, filed on Dec. 7, 2022 and designating the U.S., which claims priority to European patent application 21 213 095.9, filed on Dec. 8, 2021, both of which are hereby incorporated by reference in their entireties.

TECHNICAL FIELD

The disclosure relates to a coating device for dip coating an ophthalmic lens, a method for supplying a lacquer, and a solvent to a lacquer mixture in a coating device for dip coating an ophthalmic lens and a method for dip coating an ophthalmic lens. The disclosure, thus, relates to the technical field of manufacturing and/or coating of ophthalmic lenses, in particular of spectacle lenses.

BACKGROUND

Manufacturing ophthalmic lenses and in particular spectacle lenses typically comprises applying one or more coatings to the ophthalmic lenses, which provide specific properties to the ophthalmic lenses. For instance, coatings may be applied for improving the scratch resistance of the ophthalmic lenses. Such coatings may be adapted as hard coatings. For applying the coatings the ophthalmic lenses are typically dipped into a lacquer basin containing a liquid lacquer mixture comprising the lacquer and a solvent. Due to the coating of ophthalmic lenses dipped into the lacquer mixture and due to evaporation of solvent from the lacquer basin, a continuous supply of lacquer and solvent is required in order to maintain the density and/or concentration of the lacquer mixture at an intended level. Supplying the lacquer and the solvent, thus, typically involves individually dosing the lacquer and the solvent. The lacquer mixture is typically circulated to exhibit a permanent flow of lacquer mixture through the lacquer basin in which the ophthalmic lenses may be dipped. The technical challenges include achieving a homogeneous mixture of the lacquer and the solvent.

In the context of the disclosure, an ophthalmic lens is understood to be in particular a finished lens, i.e., according to DIN EN ISO 13666:2019-12, section 3.8.7, a lens which has its final optical surface on both sides and, if applicable, has already been ground. According to DIN EN ISO 13666:2019-12, section 3.8.9, a ground lens is a finished lens that has been ground to its final size and shape. However, in the context of the disclosure, the term spectacle lens also explicitly includes a spectacle lens blank, which according to DIN EN ISO 13666:2019-12, section 3.8.1 is a piece of an optical material with an optically finished surface for the manufacture of a spectacle lens, i.e., a semi-finished spectacle lens product, which is sometimes also referred to as a "puck". The spectacle lens may be made of any material.

The document EP3089826B1 describes a conventional method of dosing and supplying a lacquer and a solvent into a circulation of the lacquer mixture by feeding the lacquer and the solvent into an overflow channel arranged at the lacquer basin for collecting the lacquer mixture overflowing the lacquer basin. This approach aims to maximize the circulation time and distance of the lacquer and the solvent fed into the system in order to increase the chance of achieving a suitable mixing of the lacquer and the solvent before it gets in contact with an ophthalmic lens dipped into the lacquer basin.

JP H07 209884 A describes a electrophotographic photoreceptor being formed by dipping a cylindrical conductive substrate into a coating bath receiving a photoconductive coating material through a coating material filter and pulling it up to coat it with the photoconductive coating material in the manufacturing apparatus of the photoreceptor. The photoconductive coating material is processed by feeding it into the lower part of the coating bath.

U.S. 2007/240643 A1 describes a layer forming apparatus for forming a photosensitive layer of an electrophotographic photoreceptor, containing no bubbles in a coating liquid. In the layer forming apparatus for forming the photosensitive layer of the electrophotographic photoreceptor through the dip coating method, a lower end port of a dipping cylinder is distanced away in a horizontal direction from a coating liquid discharge port, and the coating liquid discharge port is disposed above the lower end port of the dipping cylinder, in order to prevent a bubble from moving into a coating liquid portion used for actual coating even when a bubble exits in the course of circulation of the coating liquid.

JP H11 76893 A describes a pull-up type coating apparatus, the coating liquid supply port for supplying the coating liquid to the inside of the dip tank is provided on the side wall of the dip tank, and the coating liquid is provided. It is characterized in that a coating liquid discharge port for discharging the liquid from the dip tank is provided at the lowermost position of the dip tank.

SUMMARY

The technical problem relates to providing a coating device having a low technical complexity and a facilitated method for dip coating ophthalmic lenses. The technical problem is solved by coating devices and a methods having the features specified in the description.

In one aspect a coating device for dip coating an ophthalmic lens is provided. The coating device comprises a lacquer basin for receiving a lacquer mixture, wherein the lacquer mixture comprises a lacquer and a solvent. The coating device further comprises an overflow channel arranged at the lacquer basin for collecting the lacquer mixture overflowing from the lacquer basin. Moreover, the coating device comprises a tubing system, which is connected to the lacquer basin for providing an influx of the lacquer mixture to the lacquer basin, and which is connected to the overflow channel for collecting a return flux of the lacquer mixture from the overflow channel, such as to enable a circulation of the lacquer mixture through the lacquer basin, the overflow channel and the tubing system. The coating device further comprises a supply unit for dosing the lacquer and the solvent for supplying the lacquer mixture, wherein the supply unit is connected directly to the tubing system and adapted to feed at least one of the lacquer and the solvent directly into the tubing system.

In another aspect a method for supplying a lacquer and a solvent to a lacquer mixture in a coating device for dip coating of an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel. The method further comprises generating a circulation of the lacquer mixture through the lacquer basin, the overflow channel and the tubing system. Moreover, the method comprises measuring a density of the circulating lacquer mixture and feeding the lacquer and the solvent directly into the tubing system as well as dosing at least one of the lacquer and the solvent depending on the measured density of the circulating lacquer mixture.

In another aspect a method for dip coating an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel. The method further comprises generating a circulation of the lacquer mixture through the lacquer basin, the overflow channel and the tubing system. Moreover, the method comprises dip coating the ophthalmic lens in the lacquer mixture received in the lacquer basin, and measuring a density of the circulating lacquer mixture. The method further comprises feeding the lacquer and the solvent directly into the tubing system and dosing at least one of the lacquer and the solvent depending on the measured density of the circulating lacquer mixture.

Dip coating of an ophthalmic lens means that the ophthalmic lens to be coated may be dipped into the lacquer mixture contained in the lacquer basin. For this purpose, the lacquer basin may be at least partly open on the upper side to allow entering the ophthalmic lens. The coating may be for instance a hard coating for increasing a scratch resistance of the ophthalmic lens. For instance, a coating may have a thickness between 1 μm and 5 μm. A coating may be applied to neat ophthalmic lenses having no coating and/or to ophthalmic lenses having already one or more coatings prior to the dip coating. The device may be adapted to sequentially dip coat multiple ophthalmic lenses and/or to dip coat more than one ophthalmic lens at least partly in parallel.

In another aspect, a coating device for dip coating an ophthalmic lens is provided. The coating device comprises a lacquer basin for receiving a lacquer mixture, wherein the lacquer mixture comprises a lacquer and a solvent, an overflow channel arranged at the lacquer basin for collecting the lacquer mixture overflowing from the lacquer basin, and a tubing system, which is connected to the lacquer basin for providing an influx of the lacquer mixture to the lacquer basin and which is connected to the overflow channel for collecting a return flux of the lacquer mixture from the overflow channel, such as to enable a circulation of the lacquer mixture through the lacquer basin, the overflow channel and the tubing system. Furthermore, the coating device comprises a supply unit for dosing the lacquer and the solvent for supplying the lacquer mixture. The supply unit is connected to the tubing system and adapted to feed at least one of the lacquer and the solvent directly into the tubing system. The supply unit is connected via a supply tubing to a lacquer reservoir and a solvent reservoir, wherein the supply tubing comprises a lacquer supply tubing for connecting the supply unit with the lacquer reservoir and a solvent supply tubing for connecting the supply unit with the solvent reservoir, and wherein the lacquer supply tubing comprises a lacquer valve and a lacquer dosing pump for supplying and dosing the lacquer from the lacquer reservoir and wherein the solvent supply tubing comprises a solvent valve and a solvent dosing pump for supplying and dosing the solvent from the solvent reservoir.

In another aspect, a method for supplying a lacquer and a solvent to a lacquer mixture in a coating device for dip coating an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel. The method further comprises generating a circulation of the lacquer mixture through the lacquer basin, the overflow channel and the tubing system, and measuring a density of the circulating lacquer mixture. The method further comprises feeding the lacquer and the solvent directly into the tubing system and dosing at least one of the lacquer and the solvent depending on the measured density of the circulating lacquer mixture. The supply unit is connected via a supply tubing to a lacquer reservoir and a solvent reservoir, wherein the supply tubing comprises a lacquer supply tubing for connecting the supply unit with the lacquer reservoir and a solvent supply tubing for connecting the supply unit with the solvent reservoir, and wherein the lacquer supply tubing comprises a lacquer valve and a lacquer dosing pump for supplying and dosing the lacquer from the lacquer reservoir and wherein the solvent supply tubing comprises a solvent valve and a solvent dosing pump for supplying and dosing the solvent from the solvent reservoir.

In another aspect a method for dip coating an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel, generating a circulation of the lacquer mixture through the lacquer basin, the overflow channel and the tubing system, dip coating the ophthalmic lens in the lacquer mixture received in the lacquer basin, and measuring a density of the circulating lacquer mixture. The method further comprises feeding the lacquer and the solvent directly into the tubing system and dosing at least one of the lacquer and the solvent depending on the measured density of the circulating lacquer mixture. The supply unit is connected via a supply tubing to a lacquer reservoir and a solvent reservoir, wherein the supply tubing comprises a lacquer supply tubing or connecting the supply unit with the lacquer reservoir and a solvent supply tubing for connecting the supply unit with the solvent reservoir, and wherein the lacquer supply tubing comprises a lacquer valve and a lacquer dosing pump for supplying and dosing the lacquer from the lacquer reservoir and wherein the solvent supply tubing comprises a solvent valve and a solvent dosing pump for supplying and dosing the solvent from the solvent reservoir.

In another aspect a coating device for dip coating an ophthalmic lens is provided. The coating device comprises a lacquer basin for receiving a lacquer mixture, wherein the lacquer mixture comprises a lacquer and a solvent, an overflow channel arranged at the lacquer basin for collecting the lacquer mixture overflowing from the lacquer basin, a tubing system, which is connected to the lacquer basin for providing an influx of the lacquer mixture to the lacquer basin, and which is connected to the overflow channel for collecting a return flux of the lacquer mixture from the overflow channel, such as to enable a circulation of the lacquer mixture through the lacquer basin, the overflow channel and the tubing system, and a supply unit for dosing the lacquer and the solvent for supplying the lacquer mixture. The supply unit is connected to the tubing system and adapted to feed at least one of the lacquer and the solvent directly into the tubing system. The tubing system further comprises a flow cooler having an inlet and an outlet, wherein the tubing system is adapted to feed the return flux collected from the overflow channel into the inlet of the flow cooler.

In another aspect a method for supplying a lacquer and a solvent to a lacquer mixture in a coating device for dip coating an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel, generating a circulation of the lacquer mixture through the lacquer basin, the overflow channel and the tubing system, wherein the tubing system comprises a flow cooler having an inlet and an outlet and is adapted to feed the return flux collected from the overflow channel into the inlet of the flow cooler, measuring a density of the circulating lacquer mixture, and feeding the lacquer and the solvent directly into the tubing system and dosing at least one of the lacquer and the solvent depending on the measured density of the circulating lacquer mixture.

In another aspect a method for dip coating an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel, generating a circulation of the lacquer mixture through the lacquer basin, the overflow channel and the tubing system, wherein the tubing system comprises a flow cooler having an inlet and an outlet and is adapted to feed the return flux collected from the overflow channel into the inlet of the flow cooler, dip coating the ophthalmic lens in the lacquer mixture received in the lacquer basin, measuring a density of the circulating lacquer mixture, and feeding the lacquer and the solvent directly into the tubing system and dosing at least one of the lacquer and the solvent depending on the measured density of the circulating lacquer mixture.

In another aspect a coating device for dip coating an ophthalmic lens is provided. The coating device comprises a lacquer basin for receiving a lacquer mixture, wherein the lacquer mixture comprises a lacquer and a solvent, an overflow channel arranged at the lacquer basin for collecting the lacquer mixture overflowing from the lacquer basin, a tubing system, which is connected to the lacquer basin for providing an influx of the lacquer mixture to the lacquer basin, and which is connected to the overflow channel for collecting a return flux of the lacquer mixture from the overflow channel, such as to enable a circulation of the lacquer mixture through the lacquer basin, the overflow channel and the tubing system, and a supply unit for dosing the lacquer and the solvent for supplying the lacquer mixture. The supply unit is connected to the tubing system and adapted to feed at least one of the lacquer and the solvent directly into the tubing system. The lacquer basin of the coating device is passively thermally isolated from its surrounding.

In another aspect a method for supplying a lacquer and a solvent to a lacquer mixture in a coating device for dip coating an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel, generating a circulation of the lacquer mixture through the lacquer basin, the overflow channel and the tubing system, and measuring a density of the circulating lacquer mixture. The method includes feeding the lacquer and the solvent directly into the tubing system and dosing at least one of the lacquer and the solvent depending on the measured density of the circulating lacquer mixture, and cooling the lacquer mixture by feeding the return flux collected from the overflow channel into a flow cooler, wherein the tubing system is provided with a flow cooler having an inlet and an outlet connected to the tubing system.

In yet another aspect a method for dip coating an ophthalmic lens is provided. The method comprises providing a lacquer basin for receiving a lacquer mixture, an overflow channel arranged at the lacquer basin for collecting the lacquer mixture overflowing from the lacquer basin, and a tubing system, which is connected to the lacquer basin for providing an influx of the lacquer mixture to the lacquer basin, and which is connected to the overflow channel for collecting a return flux for the lacquer mixture from the overflow channel, generating a circulation of the lacquer mixture through the lacquer basin, the overflow channel and the tubing system, dip coating the ophthalmic lens in the lacquer mixture received in the lacquer basin, and measuring a density of the circulating lacquer mixture. The method further comprises feeding the lacquer and the solvent directly into the tubing system and dosing at least one of the lacquer and the solvent depending on the measured density of the circulating lacquer mixture, and cooling the lacquer mixture by feeding the return flux collected from the overflow channel into a flow cooler, wherein the tubing system is provided with a flow cooler having an inlet and an outlet connected to the tubing system.

The lacquer mixture is a liquid comprising the lacquer and a solvent, wherein a viscosity of the lacquer mixture may be adjusted by a relative concentration, i.e., a relative mixing ratio, of the lacquer and the solvent. Dosing the lacquer and/or the solvent may comprise controlling the supplied amounts of lacquer and/or solvent.

The lacquer basin may be a receptacle having an inlet for feeding an influx of the lacquer mixture into the lacquer basin and may be opened at the top to allow inserting one or more ophthalmic lenses into the lacquer mixture for dip coating. The lacquer mixture may be continuously provided to the lacquer basin to achieve a laminar flow, wherein the laminar flow and a displacement of volume of lacquer mixture due to an insertion of an ophthalmic lens may provoke an overflow flow of lacquer mixture from the lacquer basin into the overflow channel. The overflown lacquer mixture may then be collected from the overflow channel and fed into the tubing system as a return flux. The overflow channel may be arranged directly at an outer side of a side wall of the lacquer basin. In particular, the outer side of the side wall of the lacquer basin may form an inner wall of the overflow channel. However, the overflow channel may also be provided in the form of an overflow basin arranged around and/or underneath the lacquer basin. The overflow channel may be provided in one piece with the lacquer basin and/or separately from the lacquer basin.

The return flux of the lacquer mixture may be a flux of lacquer mixture from the overflow channel to a pump generating a circulation of the lacquer mixture. The influx may be a flux of the lacquer mixture from the pump generating the circulation of the lacquer mixture to the lacquer basin.

The tubing system comprises tubes and/or hoses for carrying the lacquer mixture and optionally the lacquer and the solvent. Thus, the tubing system may comprise suitable hoses and/or tubes and/or pipes. Moreover, the tubing system may comprise further elements which may be advantageous for generating a circulation of the lacquer mixture. For instance, the tubing system may comprise one or more of the following elements: a filter unit for filtering particles from the lacquer mixture; a pump for circulating the lacquer mixture through the lacquer basin, the overflow channel and the tubing system; and a density meter for measuring the density of the lacquer mixture. The tubing system may have means for exhausting air from the tubing system, which may possibly be present inside the tubing system. This may allow preventing or reducing air bubbles in the circulation of lacquer mixture and, hence, may improve the coating result and/or reduce an undesired generation of solid microparticles in the lacquer mixture.

The supply unit is a unit for supplying and dosing the lacquer and/or the solvent to be supplied to the hosing system for compensating the losses of lacquer and solvent from the lacquer mixture and/or for changing the concentration or density of the lacquer mixture. Therefore, the supply unit may comprise a supply tubing, for connecting the tubing system with a lacquer reservoir and/or a solvent reservoir. In particular, the supply tubing may comprise a lacquer supply tubing for connecting the tubing system and/or the supply unit with the lacquer reservoir and a solvent supply tubing for connecting the tubing system and/or the supply unit with the solvent reservoir. The lacquer reservoir and the solvent reservoir may each form a part of the supply unit or may be provided separately from the supply unit. Moreover, the supply unit may comprise one or more valves for opening and closing and/or varying the connection between the tubing unit and the lacquer and/or solvent reservoirs. This may allow preventing an undesired flow of lacquer and/or solvent from the respective reservoir to the tubing system due to the circulation of lacquer mixture in the tubing system. The circulation of the lacquer mixture in the tubing system and in particular the suction of a pump in the tubing system generating the circulation may be used for sucking solvent and/or lacquer from the respective reservoir into the tubing system, if the respective valve is opened. However, additionally or alternatively the supply unit may comprise one or more dosing pumps for dosing and supplying the lacquer and/or the solvent from the respective reservoir to the tubing system independently of the circulation of the lacquer mixture. This may allow a particularly sensitive dosing of the lacquer and/or the solvent. The supply lines may have a check valve for preventing an undesired back flow of solvent and/or lacquer into the reservoir. Moreover, the supply lines may have means for removing air from the supply lines.

The supply unit being connected to the tubing system and being adapted to feed at least one of the lacquer and the solvent directly into the tubing system means that the supply unit does not feed the lacquer and/or the solvent indirectly into the tubing system, for instance via other elements of the circulation path. The supply unit may have one or more separate inlets dedicated for the supply unit for feeding the lacquer and/or the solvent into the tubing system. In particular, the supplying is adapted not to feed the lacquer and the solvent into the overflow channel and via the flow channel indirectly into the tubing system, as known from the related art.

The disclosure provides the advantage that the technical complexity of the lacquer basin may be reduced, as no supply lines and inlets for the lacquer and the solvent have to be provided in or at the lacquer basin. More specifically, the lacquer basin may be provided with a single sidewall in contrast to conventional lacquer basins known from the related art, which require inlets and supply lines for feeding the dosed solvent and the lacquer into the overflow channel. Hence, the manufacturing process for the lacquer basin may be facilitated and the manufacturing costs may be reduced. Furthermore, this may facilitate the processes of cleaning the lacquer basin.

In addition, the technically facilitated construction of the lacquer basin not having integrated supply lines for dosing the lacquer and the solvent prevents a density inhomogeneity of the lacquer mixture within the lacquer basin. In particular, the risk of density hotspots having a significantly higher or lower density of lacquer than the surrounding, which may lead to inhomogeneous coatings, can be avoided or reduced.

Moreover, due to the reduced complexity of the lacquer basin according to the disclosure in contrast to conventional lacquer basins, and in particular due to the option of providing the lacquer basin with a single sidewall, the lacquer basin may be thermally isolated for keeping the lacquer mixture in the lacquer basin at chilled temperatures. Thus, the control of temperature of the lacquer basin and the contained lacquer mixture may be carried out in a passive manner by merely thermally isolating the lacquer basin from the surrounding. In other words, the lacquer basin may be passively thermally isolated from its surrounding and the coating device may be adapted to entirely passively control a temperature of the lacquer basin. This may be achieved by providing the sidewall of the lacquer basin from a material having a low heat conductivity and/or for providing the sidewall with integrated evacuated chambers. In particular the latter option may be facilitated due to the lack of requiring inlets and feeding lines for lacquer and solvent within the side wall, in contrast to conventional lacquer basins. Moreover, as there is no need for actively cooling the lacquer basin, a close contact of the lacquer basin with a cooling liquid can be avoided, which reduces or avoids the risks of contaminating the lacquer mixture with the cooling liquid. By refraining from an active cooling, vibrations originating in an active cooling system may be avoided, which could otherwise reduce the homogeneity of the resulting coating. Moreover, an active cooling, as conventionally used, can be performed only from the outside of the sidewall of the lacquer basin, as otherwise the laminar flow of the lacquer mixture would be disturbed, which renders a temperature gradient within the lacquer basin often inevitable.

This disadvantage can be avoided by a coating device according to the present disclosure not requiring an active cooling of the lacquer basin.

A sidewall of the lacquer basin may be provided at least partly from a material having a heat conductivity of 10 W/(m·K) or less. Optionally, the entire side wall of the lacquer basin may be made of this material. This may ensure a high thermal isolation of the lacquer mixture contained in the lacquer basin from the surrounding of the lacquer basin. For instance, the side wall of the lacquer basin may comprise or be made of at least one of the following materials: a porous material, a polymeric material, a foam-like material, polystyrene, and mineral wool. The side wall may comprise multiple layers of which one or more layers may comprise the material having a heat conductivity of 10 W/(m·K) or less. The material having a heat conductivity of 10 W/(m·K) or less may be sandwiched in between several layers made from a different material having a higher heat conductivity. This may avoid the lacquer mixture getting into direct contact with the material having a heat conductivity of 10 W/(m·K) or less. Alternatively or additionally, the sidewall of the lacquer basin may be provided with one or more integrated evacuated chambers. This may further reduce the heat conductivity of the side wall.

Moreover, as there is no need to provide the lacquer and the solvent directly at the lacquer basin for dosing and supplying it into the overflow channel (as it is necessary in the related art), there is no need of storing the reservoirs and supply lines for the lacquer and the solvent in the vicinity of the lacquer basin. This allows keeping the reservoirs and supply lines at a more convenient location and may facilitate keeping the lacquer and the solvent at chilled temperatures. In particular, directly connecting the supply lines for lacquer and solvent with the tubing system may allow keeping the supply lines of the supply unit short, which reduces a possible increase of temperature of the lacquer and solvent carried by the supply lines. Moreover, the reservoirs for the solvent and the lacquer may be actively chilled. Furthermore, these advantages may allow the whole coating device being thermally isolated.

The supply unit may be adapted to feed at least one of the lacquer and the solvent directly into the return flux of the lacquer mixture collected from the overflow channel and carried in the tubing system. This may provide the advantage that the dosed lacquer and solvent supplied to the tubing system flows through a large part of the tubing system and optionally through a pump generating the circulation of the lacquer mixture, which may contribute to the mixing of the supplied lacquer and solvent. However, alternatively or additionally the supply unit may be adapted to feed at least one of the lacquer and the solvent directly into the influx of the lacquer mixture supplied to the lacquer basin. For instance, lacquer may be supplied to the return flux and the solvent may be supplied to the influx or vice versa.

However, the supply unit may be adapted to feed the lacquer and the solvent directly into at least one of the return flux of the lacquer mixture collected from the overflow channel and the influx of the lacquer mixture supplied to the lacquer basin. In other words, the lacquer and the solvent may be supplied to the tubing system in the same section of the tubing system. The lacquer and the solvent may be fed into the tubing system separately from each other. Alternatively, the solvent and the lacquer may be mixed with each other in the supply unit before feeding the mixed lacquer and solvent into the tubing system. This may reduce possible variations and hotspots of the density of the lacquer mixture.

The supply tubing may comprise at least one of a valve and a dosing pump for supplying and dosing at least one of the lacquer from the lacquer reservoir and the solvent from the solvent reservoir. This may allow a precise dosing of the lacquer and/or the solvent independent of the circulation of the lacquer mixture in the tubing system. The lacquer supply tubing may comprise at least one of a lacquer valve and a lacquer dosing pump for supplying and dosing the lacquer from the lacquer reservoir. The solvent supply tubing may comprise at least one of a solvent valve and a solvent dosing pump for supplying and dosing the solvent from the solvent reservoir.

The tubing system may further comprise a flow cooler having an inlet and an outlet, wherein the tubing system may be adapted to feed the return flux collected from the overflow channel into the inlet of the flow cooler. This allows providing the lacquer mixture at a chilled temperature, which may be advantageous or required for the coating process. Moreover, the flow of the dosed and supplied lacquer and solvent through the flow cooler may favor the mixing of the supplied solvent and lacquer and, hence, increase the homogeneity of the lacquer mixture.

Moreover, the tubing system may further comprise a static mixer. The static mixer may be integrated into the flow cooler. This may further enhance the mixing of the lacquer and the solvent and, thus, increase the homogeneity of the lacquer mixture. The supply unit may be connected to the tubing system upstream of the inlet of the flow cooler or the static mixer. This ensures that the dosed and supplied lacquer and solvent flow through the static mixture prior to be fed into the lacquer basin and, hence, that a proper mixing of the solvent and the lacquer is achieved prior to the lacquer mixture getting into contact with an ophthalmic lens in a dip coating process.

The tubing system may further comprise at least one of the following elements: a density meter for measuring the density of the lacquer mixture; a pump for circulating the lacquer mixture through the lacquer basin, the overflow channel and the tubing system; and a filter unit for filtering particles from the lacquer mixture. In other words, besides tubes and/or hoses and/or pipes for carrying the lacquer mixture, the tubing system may comprise other elements, which may be involved in providing a circulation of the lacquer mixture and/or in providing the lacquer mixture with a high level of homogeneity and a low level of undesired particles, contaminations and/or air bubbles.

BRIEF DESCRIPTION OF THE DRAWINGS

It is understood by a person skilled in the art that the above-described features and the features in the following description and drawings are not only disclosed in the explicitly disclosed embodiments, examples, and combinations, but that also other technically feasible combinations as well as the isolated features are comprised by the disclosure. In the following, exemplary embodiments and specific examples are described with reference to the drawings for illustrating the disclosure without limiting the disclosure to the described exemplary embodiments.

DESCRIPTION OF EXEMPLARY EMBODIMENTS

Figure 1:
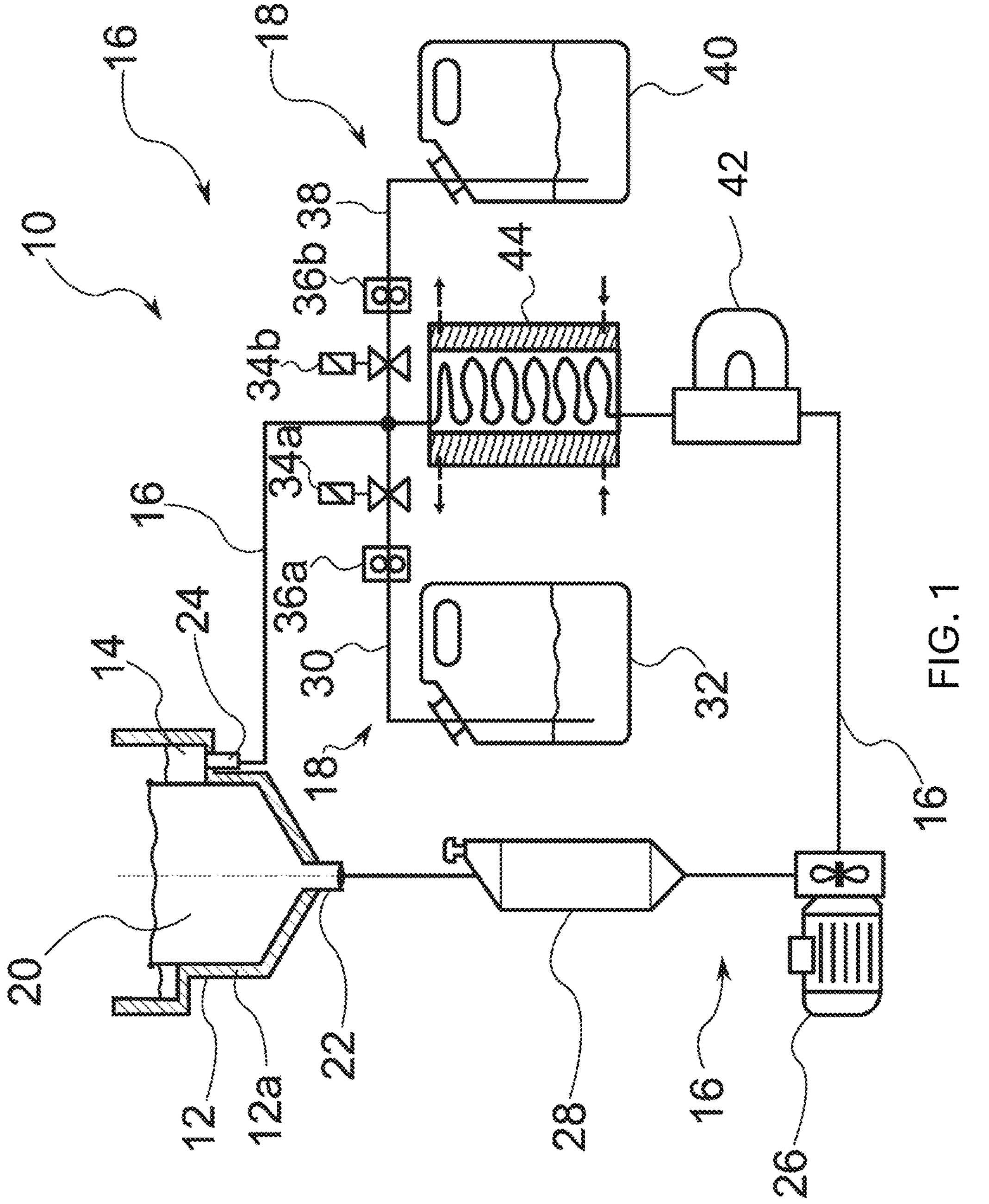
FIG. 1 depicts a coating device for dip coating of ophthalmic lenses according to an exemplary embodiment.

FIG. 1 shows an exemplary embodiment of a coating device 10 for dip coating of one or more ophthalmic lenses. The coating device 10 comprises a lacquer basin 12, an overflow channel 14 arranged next to the lacquer basin 12, a tubing system 16 and a supply unit 18 for dosing and supplying a lacquer and a solvent to the tubing system 16.

The lacquer basin 12 is formed as a receptacle for receiving a liquid lacquer mixture 20, wherein an influx of lacquer mixture 20 into the lacquer basin 12 is provided by the tubing system 16 at an inlet 22 at the bottom of the lacquer basin 12. For keeping the lacquer mixture 20 contained in the lacquer basin 12 at a temperature suitable for the dip coating process, a sidewall 12*a* of the lacquer basin 12 is thermally isolated to reduce a heat flow from the surrounding to the lacquer mixture 20 and vice versa. In particular, the sidewall 12*a* and the lacquer basin 12 do not require any tubing or inlets for dosing lacquer and solvent and do not require any active cooling means. Thus, the side wall 12*a* and the lacquer basin 12 can be kept at a low level of technical complexity and may be optimized for passive thermal isolation. The lacquer basin 12 is opened at the top to allow dipping one or more ophthalmic lenses to be coated into the lacquer mixture 20 contained in the lacquer basin 12 for dip coating.

The overflow channel 14 is arranged directly at the upper end of the lacquer basin 12 such as to surround the opening of the lacquer basin 12. This allows collecting any lacquer mixture 20 overflowing the lacquer basin 12 and returning the collected overflown lacquer mixture 20 via an outlet 24 as a return flux of lacquer mixture 20 into the tubing system 16.

The coating device 10 is adapted to generate a circulation of a lacquer mixture 20 through the coating device 10, i.e., through the tubing system 16, the lacquer basin 12 and the overflow channel 14, wherein the circulating lacquer mixture 20 enters the lacquer basin 12 through the inlet 22 at the bottom of the lacquer basin 12 and flows in a laminar flow in an upward direction to overflow the lacquer basin 12 and enter the overflow channel 14 to be collected and fed via the outlet 24 as return flux into the tubing system 16. The upward directed laminar flow of the lacquer mixture 20 inside the lacquer basin 12 is advantageous for the dip coating process in order to achieve a homogenous coating at an ophthalmic lens dipped into the lacquer mixture 20. The volume of lacquer mixture 20 which is displaced by dipping an ophthalmic lens inside the lacquer mixture 20 likewise flows over into the overflow channel 14 and is collected and becomes part of the return flux.

The tubing system 16 forms a closed loop allowing the lacquer mixture 20 to circulate in a constant flow through the tubing system 16, the lacquer basin 12 and the overflow channel 14. For generating the circulation, the coating device 10 comprises a pump 26, which may form a part of the tubing system 16, for generating a suction to provide a flow of the lacquer mixture through the tubing system 16. In addition, the tubing system 16 comprises a filter unit 28 for filtering undesired particles, contaminations and/or air bubbles from the circulating lacquer mixture 20 streaming through the filter unit 28.

In order to keep the lacquer mixture 20 at a desired density and/or viscosity and/or to keep a certain ratio of lacquer and solvent within the lacquer mixture 20, the supply unit 18 is provided. The supply unit 18 comprises a lacquer supply tubing 30 connecting a lacquer reservoir 32 with the tubing system 16 for dosing and supplying the lacquer to the lacquer mixture 20 flowing through the tubing system 16. According to the presented exemplary embodiment, the lacquer supply tubing 30 comprises a lacquer valve 34*a* and a lacquer dosing pump 36, which allow a precise dosing of the lacquer supplied from the lacquer reservoir 32 to the tubing system 16 independently of a possible suction generated by the pump 26 driving the circulation of the lacquer mixture 20. The supply unit 18 further comprises a solvent supply tubing 38 connecting a solvent reservoir 40 with the tubing system 16, which may be identical or similar to the lacquer supply tubing 30. Likewise, also the solvent supply tubing 38 may comprise a solvent valve 34*b* and a solvent dosing pump 36*b* for dosing and supplying the solvent to the tubing system 16. The valves 34*a*, 34*b* may be check valves for preventing an undesired flow of lacquer or solvent or lacquer mixture back into the lacquer reservoir 32 or solvent reservoir 40, respectively. An active and/or passive cooling may be provided for the lacquer reservoir 32 and/or the solvent reservoir 40.

In addition, the tubing system may comprise a density meter 42 for measuring the density of the lacquer mixture 20. The dosing and supply of lacquer and solvent by the supply unit 18 may be based on the density measured by the density meter 42. This allows controlling the dosing and the supply of the lacquer and/or the solvent and in a closed loop to constantly provide the lacquer mixture with a desired density.

Moreover, the tubing system 16 comprises a flow cooler 44 for cooling the lacquer mixture 20 while flowing through the flow cooler 44. The flow cooler 44 may have one or more inlets and outlets for a cooling fluid, such as water. According to the presented exemplary embodiment, the supply unit 18 is arranged such that the lacquer and solvent are provided into the return flux of the lacquer mixture returning from the overflow channel 14 and prior to the inlet of the flow cooler 44. Hence, right after dosing and supplying the lacquer and solvent to the tubing system 16, the lacquer and solvent enter the flow cooler 44 together with the return flux of the lacquer mixture 20. During the passage of the lacquer, the solvent and the lacquer mixture through the flow cooler 44 an efficient mixing of these components may occur, which may result in a homogeneous lacquer mixture 20 having the desired density. According to an exemplary embodiment, the flow cooler 44 may be provided with a static mixer (not shown) included in the flow cooler 44. This may further enhance the mixing process. Alternatively or additionally, a separate static mixer (not shown) may be provided independently of the flow cooler 44 in the tubing system 16.

The arrangement of the supply unit 18, the flow cooler 44 and the density meter 42 between the overflow channel 14 and the pump 26, i.e., in the return flux, bears the advantage that there is a significant remaining flow distance of the supplied lacquer and solvent until the resupplied lacquer mixture 20 reaches an ophthalmic lens dipped into the lacquer basin 12. Hence, a homogeneous lacquer mixture 20 can be achieved. Moreover, the resupplied lacquer mixture 20 flows through the pump 26 prior to reaching the lacquer basin 12, which may provide an additional mixing of the components. However, according to other exemplary embodiments the supply unit may be arranged at a different position of the tubing system 16, such as between the flow cooler 44 and the pump and/or between the pump and the lacquer basin 12.

Figure 2:
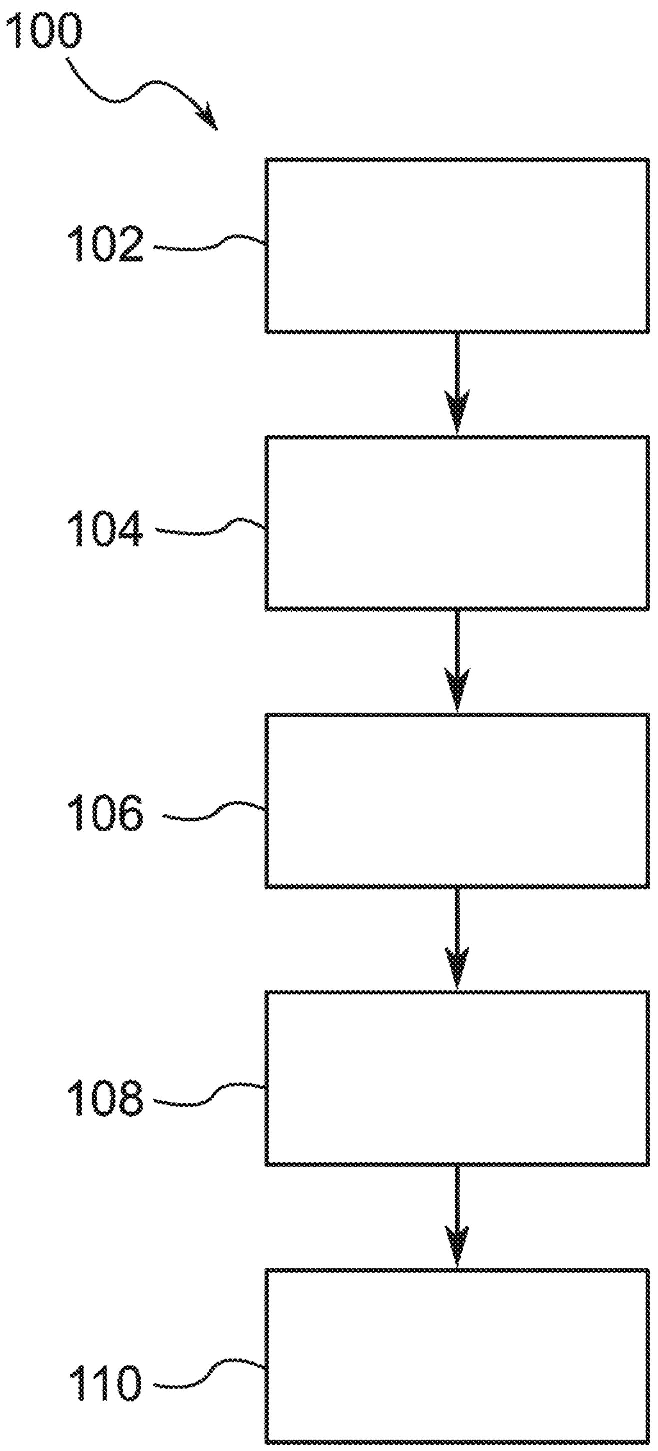
FIG. 2 schematically illustrates a method 100 according to an exemplary embodiment for dip coating an ophthalmic lens.

FIG. 2 schematically illustrates a method 100 according to an exemplary embodiment for dip coating an ophthalmic lens.

In a first step 102, the method comprises providing a lacquer basin 12 for receiving a lacquer mixture 20, an overflow channel 14 arranged at the lacquer basin 12 for collecting the lacquer mixture 20 overflowing from the lacquer basin 12, and a tubing system 16, which is connected to the lacquer basin 12 for providing an influx of the lacquer mixture 20 to the lacquer basin 12, and which is connected to the overflow channel 14 for collecting a return flux for the lacquer mixture 20 from the overflow channel 14.

In a second step 104, the method comprises generating a circulation of the lacquer mixture through the lacquer basin 12, the overflow channel 14 and the tubing system 16.

In another step 106, the method comprises dip coating the ophthalmic lens in the lacquer mixture 20 received in the lacquer basin (14).

In yet another step 108, the method comprises measuring a density of the circulating lacquer mixture (20).

In yet another step 110, the method comprises feeding the lacquer and the solvent directly into the tubing system 16 and dosing at least one of the lacquer and the solvent depending on the measured density of the circulating lacquer mixture 20.

Figure 3:
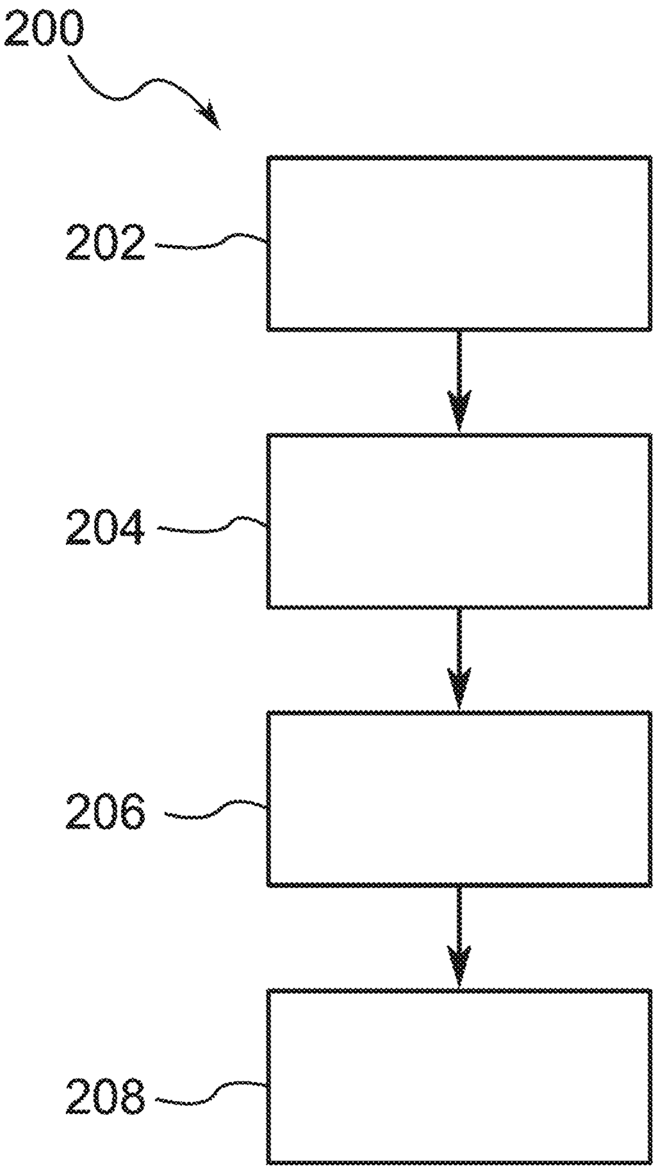
FIG. 3 schematically illustrates a method according to an exemplary embodiment for supplying a lacquer and a solvent to a lacquer mixture in a coating device for dip coating an ophthalmic lens.

FIG. 3 schematically illustrates a method 200 according to an exemplary embodiment for supplying a lacquer and a solvent to a lacquer mixture in a coating device 10 for dip coating an ophthalmic lens.

In a first step 202, the method comprises providing a lacquer basin 12 for receiving a lacquer mixture 20, an overflow channel 14 arranged at the lacquer basin for collecting the lacquer mixture 20 overflowing from the lacquer basin 12, and a tubing system 16, which is connected to the lacquer basin 12 for providing an influx of the lacquer mixture 20 to the lacquer basin 12, and which is connected to the overflow channel 14 for collecting a return flux for the lacquer mixture 20 from the overflow channel 14.

In a second step 204, the method comprises generating a circulation of the lacquer mixture 20 through the lacquer basin 12, the overflow channel 14 and the tubing system 16.

In another step 206, the method comprises measuring a density of the circulating lacquer mixture 20.

In yet another step 208, the method comprises feeding the lacquer and the solvent directly into the tubing system 16 and dosing at least one of the lacquer and the solvent depending on the measured density of the circulating lacquer mixture 20.

The disclosure further includes the following optional clauses without being limited to these clauses:

Clause 1. Coating device (10) for dip coating an ophthalmic lens, the coating device (10) comprising:
- a lacquer basin (12) for receiving a lacquer mixture (20), wherein the lacquer mixture (20) comprises a lacquer and a solvent;
- an overflow channel (14) arranged at the lacquer basin (12) for collecting the lacquer mixture (20) overflowing from the lacquer basin (12);
- a tubing system (16), which is connected to the lacquer basin (12) for providing an influx of the lacquer mixture (20) to the lacquer basin (12), and which is connected to the overflow channel (14) for collecting a return flux of the lacquer mixture (20) from the overflow channel (14), such as to enable a circulation of the lacquer mixture (20) through the lacquer basin (12), the overflow channel (14) and the tubing system (16);
- a supply unit (18) for dosing the lacquer and the solvent for supplying the lacquer mixture;

characterized in that the supply unit (18) is connected to the tubing system (16) and adapted to feed at least one of the lacquer and the solvent directly into the tubing system (16).

Clause 2. Coating device (10) according to clause 1, wherein the supply unit (18) is adapted to feed at least one of the lacquer and the solvent directly into the return flux of the lacquer mixture (20) collected by the overflow channel (14).

Clause 3. Coating device (10) according to clause 1 or 2, wherein the supply unit (18) is adapted to feed at least one of the lacquer and the solvent directly into the influx of the lacquer mixture (20) supplied to the lacquer basin (12).

Clause 4. Coating device (10) according to clause 2 or 3, wherein supply unit (18) is adapted to feed the lacquer and the solvent directly into at least one of the return flux of the lacquer mixture (20) collected from the overflow channel (14) and the influx of the lacquer mixture (20) supplied to the lacquer basin (12).

Clause 5. Coating device (10) according to any one of the preceding clauses, wherein the supply unit (18) is connected via a supply tubing (30, 38) to a lacquer reservoir (32) and a solvent reservoir (40).

Clause 6. Coating device (10) according to clause 5, wherein the supply tubing (30, 38) comprises at least one of a valve (34) and a dosing pump (36) for supplying and dosing at least one of the lacquer from the lacquer reservoir (32) and the solvent from the solvent reservoir (40).

Clause 7. Coating device (10) according to clause 5 or 6, wherein the supply tubing (30, 38) comprises a lacquer supply tubing (30) for connecting the supply unit (18) with the lacquer reservoir (32) and a solvent supply tubing (38) for connecting the supply unit (18) with the solvent reservoir (40).

Clause 8. Coating device (10) according to clause 7, wherein the lacquer supply tubing (30) comprises at least one of a lacquer valve (34*a*) and a lacquer dosing pump (36*a*) for supplying and dosing the lacquer from the lacquer reservoir (32) and/or wherein the solvent supply tubing (38) comprises at least one of a solvent valve (34*b*) and a solvent dosing pump (36*b*) for supplying and dosing the solvent from the solvent reservoir (40).

Clause 9. Coating device (10) according to any one of the preceding clauses, wherein the tubing system (16) further comprises a flow cooler (44) having an inlet and an outlet, wherein the tubing system (16) is adapted to feed the return flux collected from the overflow channel (14) into the inlet of the flow cooler (44).

Clause 10. Coating device (10) according to clause 9, wherein the tubing system (16) further comprises a static mixer and wherein the static mixer is optionally integrated into the flow cooler (44).

Clause 11. Coating device (10) according to clause 9 or 10, wherein the supply unit (18) is connected to the tubing system (16) upstream of the inlet of the flow cooler (44) or the static mixer.

Clause 12. Coating device (10) according to any one of the preceding clauses, wherein the lacquer basin (12) is passively thermally isolated from its surrounding and wherein the coating device (10) is optionally adapted to entirely passively control a temperature of the lacquer basin (12).

Clause 13. Coating device (10) according to any one of the preceding clauses, wherein the tubing system (16) further comprises at least one of the following elements:

a density meter (42) for measuring the density of the lacquer mixture (20);

a pump (26) for circulating the lacquer mixture (20) through the lacquer basin (12), the overflow channel (14) and the tubing system (16); and a filter unit (28) for filtering particles from the lacquer mixture (20).

Clause 14. Method for supplying a lacquer and a solvent to a lacquer mixture (20) in a coating device (10) for dip coating an ophthalmic lens, the method comprising:

providing a lacquer basin (12) for receiving a lacquer mixture (20), an overflow channel (14) arranged at the lacquer basin for collecting the lacquer mixture (20) overflowing from the lacquer basin (12), and a tubing system (16), which is connected to the lacquer basin (12) for providing an influx of the lacquer mixture (20) to the lacquer basin (12), and which is connected to the overflow channel (14) for collecting a return flux for the lacquer mixture (20) from the overflow channel (14), generating a circulation of the lacquer mixture (20) through the lacquer basin (12), the overflow channel (14) and the tubing system (16);

measuring a density of the circulating lacquer mixture (20);

characterized in that the method further comprises:

feeding the lacquer and the solvent directly into the tubing system (16) and dosing at least one of the lacquer and the solvent depending on the measured density of the circulating lacquer mixture (20).

Clause 15. Method for dip coating an ophthalmic lens, the method comprising:

providing a lacquer basin (12) for receiving a lacquer mixture (20), an overflow channel (14) arranged at the lacquer basin for collecting the lacquer mixture (20) overflowing from the lacquer basin (12), and a tubing system (16), which is connected to the lacquer basin (12) for providing an influx of the lacquer mixture (20) to the lacquer basin (12), and which is connected to the overflow channel (14) for collecting a return flux for the lacquer mixture (20) from the overflow channel (14), generating a circulation of the lacquer mixture (20) through the lacquer basin (12), the overflow channel (14) and the tubing system (16);

dip coating the ophthalmic lens in the lacquer mixture (20) received in the lacquer basin (14);

measuring a density of the circulating lacquer mixture (20);

characterized in that the method further comprises:

feeding the lacquer and the solvent directly into the tubing system (16) and dosing at least one of the lacquer and the solvent depending on the measured density of the circulating lacquer mixture (20).

LIST OF REFERENCE SIGNS

10 coating device
12 lacquer basin
12*a* sidewall of lacquer basin
14 overflow channel
16 tubing system
18 supply unit
20 lacquer mixture
22 inlet of lacquer basin
24 outlet of overflow channel
26 pump
28 filter unit
30 lacquer supply tubing
32 lacquer reservoir
34*a* lacquer valve
34*b* solvent valve
36*a* lacquer dosing pump
36*b* solvent dosing pump
36 dosing pump
38 solvent supply tubing
40 solvent reservoir
42 density meter
44 flow cooler
100 Method for dip coating an ophthalmic lens
200 Method for supplying a lacquer and a solvent
102-110 Method steps
202-208 Method steps

The invention claimed is:

1. A coating device for dip coating an ophthalmic lens, the coating device comprising:

a lacquer basin for receiving a lacquer mixture, wherein the lacquer mixture includes a lacquer and a solvent;

an overflow channel arranged at the lacquer basin for collecting the lacquer mixture overflowing from the lacquer basin;

a tubing system, which is connected to the lacquer basin for providing an influx of the lacquer mixture to the lacquer basin, and which is connected to the overflow channel for collecting a return flux of the lacquer mixture from the overflow channel, such as to enable a circulation of the lacquer mixture through the lacquer basin, the overflow channel and the tubing system, and a supply unit for dosing the lacquer and the solvent for supplying the lacquer mixture; wherein the tubing system includes a pump for circulating the lacquer mixture through the lacquer basin, the overflow channel and the tubing system, wherein the return flux of the lacquer mixture is a flux of lacquer mixture from the overflow channel to the pump generating a circulation of the lacquer mixture, and the influx is a flux of the lacquer mixture from the pump generating the circulation of the lacquer mixture to the lacquer basin, wherein the supply unit is connected to the tubing system and configured to feed at least one of the lacquer and the solvent directly into the tubing system, wherein the supply unit is connected via a supply tubing to a lacquer reservoir and a solvent reservoir, wherein the supply tubing includes a lacquer supply tubing for connecting the supply unit with the lacquer reservoir and a solvent supply tubing for connecting the supply unit with the solvent reservoir, wherein the lacquer supply tubing includes a lacquer valve and a lacquer dosing pump for supplying and dosing the lacquer from the lacquer reservoir and wherein the solvent supply tubing includes a solvent dosing pump for supplying and dosing the solvent from the solvent reservoir, wherein the solvent supply tubing includes a solvent valve for supplying and dosing the solvent from the solvent reservoir, and wherein the supply unit is configured to feed at least one of the lacquer and the solvent directly into the influx of the lacquer mixture supplied to the lacquer basin.

2. The coating device according to claim 1, wherein the supply unit is configured to feed the lacquer and the solvent directly into at least one of the return flux of the lacquer mixture collected from the overflow channel and the influx of the lacquer mixture supplied to the lacquer basin.

3. The coating device according to claim 1, wherein the tubing system further comprises a flow cooler having an inlet and an outlet, wherein the tubing system is configured to feed the return flux collected from the overflow channel into the inlet of the flow cooler.

4. The coating device according to claim 3, wherein the tubing system further comprises a static mixer and wherein the static mixer is optionally integrated into the flow cooler.

5. The coating device according to claim 3, wherein the supply unit is connected to the tubing system upstream of the inlet of the flow cooler or a static mixer.

6. The coating device according to claim 1, wherein the lacquer basin is passively thermally isolated from its surroundings and wherein the coating device is optionally configured to entirely passively control a temperature of the lacquer basin.

7. The coating device according to claim 1, wherein the tubing system further comprises at least one of the following elements:

a density meter for measuring the density of the lacquer mixture; and a filter unit for filtering particles from the lacquer mixture.

8. A coating device for dip coating an ophthalmic lens, the coating device comprising:

a lacquer basin for receiving a lacquer mixture, wherein the lacquer mixture contains a lacquer and a solvent;

an overflow channel arranged at the lacquer basin for collecting the lacquer mixture overflowing from the lacquer basin;

a tubing system, which is connected to the lacquer basin for providing an influx of the lacquer mixture to the lacquer basin, and which is connected to the overflow channel for collecting a return flux of the lacquer mixture from the overflow channel, such as to enable a circulation of the lacquer mixture through the lacquer basin, the overflow channel and the tubing system; and a supply unit for dosing the lacquer and the solvent for supplying the lacquer mixture, wherein the tubing system includes a pump for circulating the lacquer mixture through the lacquer basin, the overflow channel and the tubing system, wherein the return flux of the lacquer mixture is a flux of lacquer mixture from the overflow channel to the pump generating a circulation of the lacquer mixture, and the influx is a flux of the lacquer mixture from the pump generating the circulation of the lacquer mixture to the lacquer basin, wherein the supply unit is connected to the tubing system and configured to feed at least one of the lacquer and the solvent directly into the tubing system, wherein the tubing system further includes a flow cooler having an inlet and an outlet, wherein the tubing system is configured to feed the return flux collected from the overflow channel into the inlet of the flow cooler, and wherein the supply unit is configured to feed at least one of the lacquer and the solvent directly into the influx of the lacquer mixture supplied to the lacquer basin.

9. The coating device according to claim 8, wherein the tubing system further comprises a static mixer and wherein the static mixer is optionally integrated into the flow cooler.

10. The coating device according to claim 8, wherein the supply unit is connected to the tubing system upstream of the inlet of the flow cooler or the static mixer.

11. The coating device according to claim 8, wherein the lacquer basin is passively thermally isolated from its surroundings and wherein the coating device is optionally configured to entirely passively control a temperature of the lacquer basin.

12. The coating device according to claim 8, wherein the supply unit is configured to feed the lacquer or the solvent directly into the return flux of the lacquer mixture collected by the overflow channel.

13. The coating device according to claim 8, wherein the supply unit is configured to feed the lacquer and the solvent directly into the influx of the lacquer mixture supplied to the lacquer basin.

14. The coating device according to claim 8, wherein the supply unit is connected via a supply tubing to a lacquer reservoir and a solvent reservoir.

15. The coating device according to claim 14, wherein the supply tubing comprises at least one of a lacquer or solvent valve and a dosing pump for supplying and dosing at least one of the lacquer from the lacquer reservoir and the solvent from the solvent reservoir.

16. The coating device according to claim 14, wherein the supply tubing comprises a lacquer supply tubing for connecting the supply unit with the lacquer reservoir and a solvent supply tubing for connecting the supply unit with the solvent reservoir.

17. The coating device according to claim 16, wherein the lacquer supply tubing comprises at least one of a lacquer valve and a lacquer dosing pump for supplying and dosing the lacquer from the lacquer reservoir and/or wherein the solvent supply tubing includes at least one of a solvent valve and a solvent dosing pump for supplying and dosing the solvent from the solvent reservoir.

18. The coating device according to claim 8, wherein the tubing system further comprises at least one of the following elements:

a density meter for measuring the density of the lacquer mixture; and a filter unit for filtering particles from the lacquer mixture.

19. A coating device for dip coating an ophthalmic lens, the coating device comprising:

a lacquer basin for receiving a lacquer mixture, wherein the lacquer mixture contains a lacquer and a solvent;

an overflow channel arranged at the lacquer basin for collecting the lacquer mixture overflowing from the lacquer basin;

a tubing system, which is connected to the lacquer basin for providing an influx of the lacquer mixture to the lacquer basin, and which is connected to the overflow channel for collecting a return flux of the lacquer mixture from the overflow channel, such as to enable a circulation of the lacquer mixture through the lacquer basin, the overflow channel and the tubing system; and a supply unit for dosing the lacquer and the solvent for supplying the lacquer mixture, wherein the tubing system includes a pump for circulating the lacquer mixture through the lacquer basin, the overflow channel and the tubing system, wherein the return flux of the lacquer mixture is a flux of lacquer mixture from the overflow channel to the pump generating a circulation of the lacquer mixture, and the influx is a flux of the lacquer mixture from the pump generating the circulation of the lacquer mixture to the lacquer basin, wherein the supply unit is connected to the tubing system and configured to feed at least one of the lacquer and the solvent directly into the tubing system, wherein the lacquer basin is passively thermally isolated from its surroundings, wherein a side wall of the lacquer basin is provided at least partly from a material having a heat conductivity of 10 W/(m·K) or less, and/or with one or more integrated evacuated chambers, and wherein the supply unit is configured to feed at least one of the lacquer and the solvent directly into the influx of the lacquer mixture supplied to the lacquer basin.

20. The coating device according to claim 19, wherein the coating device is configured to entirely passively control a temperature of the lacquer basin.

21. The coating device according to claim 19, wherein the supply unit is configured to feed the lacquer or the solvent directly into the return flux of the lacquer mixture collected by the overflow channel.

22. The coating device according to claim 19, wherein the supply unit is configured to feed the lacquer and the solvent directly into the influx of the lacquer mixture supplied to the lacquer basin.

23. The coating device according to claim 19, wherein the supply unit is connected via a supply tubing to a lacquer reservoir and a solvent reservoir.

24. The coating device according to claim 23, wherein the supply tubing comprises at least one of a valve and a dosing pump for supplying and dosing at least one of the lacquer from the lacquer reservoir and the solvent from the solvent reservoir.

25. The coating device according to claim 23, wherein the supply tubing comprises a lacquer supply tubing for connecting the supply unit with the lacquer reservoir and a solvent supply tubing for connecting the supply unit with the solvent reservoir.

26. The coating device according to claim 25, wherein the lacquer supply tubing comprises at least one of a lacquer valve and a lacquer dosing pump for supplying and dosing the lacquer from the lacquer reservoir, and/or wherein the solvent supply tubing includes at least one of a solvent valve and a solvent dosing pump for supplying and dosing the solvent from the solvent reservoir.

27. The coating device according to claim 19, wherein the tubing system further comprises a flow cooler having an inlet and an outlet, and wherein the tubing system is configured to feed the return flux collected from the overflow channel into the inlet of the flow cooler.

28. The coating device according to claim 27, wherein the tubing system further comprises a static mixer, and wherein the static mixer is optionally integrated into the flow cooler.

29. The coating device according to claim 27, wherein the supply unit is connected to the tubing system upstream of the inlet of the flow cooler or the static mixer.

30. The coating device according to claim 19, wherein the tubing system further comprises at least one of the following elements:

a density meter for measuring the density of the lacquer mixture;

a pump for circulating the lacquer mixture through the lacquer basin, the overflow channel and the tubing system; and a filter unit for filtering particles from the lacquer mixture.

* * * * *